(12) United States Patent
Schofield

(10) Patent No.: US 6,328,911 B1
(45) Date of Patent: Dec. 11, 2001

(54) METHOD FOR THE PREVENTION OF HIGH TEMPERATURE CORROSION DUE TO ALKALI SULFATES AND CHLORIDES AND COMPOSITION FOR USE IN THE SAME

(75) Inventor: Keith Schofield, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/505,007

(22) Filed: Feb. 15, 2000

(51) Int. Cl.[7] ............ C23F 11/02; C23F 11/10; C23F 11/18; C10L 10/04
(52) U.S. Cl. ............ 252/389.54; 252/389.54; 422/194; 431/2; 431/3; 431/4; 431/8
(58) Field of Search ............ 252/389.54, 400.54; 422/194; 431/4, 3, 2, 8, 115, 116; 148/668, 673

(56) References Cited

U.S. PATENT DOCUMENTS

| | | | |
|---|---|---|---|
| 3,382,066 | * 5/1968 | Kenney et al. | 75/208 |
| 3,801,308 | * 4/1974 | Gustison | 75/129 |
| 3,841,929 | 10/1974 | Craig . | |
| 4,008,090 | * 2/1977 | Miyake et al. | 106/43 |
| 4,075,376 | 2/1978 | Jaeger . | |
| 4,463,061 | 7/1984 | Otoguro et al. . | |
| 4,515,919 | * 5/1985 | Bradley et al. | 524/591 |
| 4,816,303 | 3/1989 | Kroenke et al. . | |
| 4,831,942 | * 5/1989 | Morimoto et al. | 110/345 |
| 5,234,674 | * 8/1993 | Sommers | 423/345 |
| 5,240,741 | 8/1993 | Edwards, III et al. . | |
| 5,489,346 | 2/1996 | Erickson . | |
| 5,520,750 | 5/1996 | Riley . | |
| 5,575,920 | 11/1996 | Freese et al. . | |
| 5,747,665 | 5/1998 | Thompson . | |
| 5,774,516 | 6/1998 | Hettiarachchi et al. . | |
| 5,787,773 | * 8/1998 | Penoza | 83/13 |
| 5,802,955 | 8/1998 | Stoll et al. . | |
| 5,821,441 | 10/1998 | Kawamura . | |

OTHER PUBLICATIONS

M. Steinberg and K. Schofield; The Controlling Chemistry in Flame Generated Surfaced Deposition of $Na_2SO_4$ and the Effects of Chlorine; Twenty–Sixth Symposium of Combustion/The Combustion Institute, 1996; pp. 1835–1843.

K. Schofield; W2G07 The Intriguing Flame Deposition Chemistry of Sodium Compounds and Its Implications for High Temperature Corrosion; Poster at the 27th annual International Symposium on Combustion, in Boulder Colorado, USA, Aug. 1998.

* cited by examiner

Primary Examiner—Joseph D. Anthony
(74) Attorney, Agent, or Firm—Myers Dawes & Andras LLP; Daniel L. Dawes, Esq.

(57) ABSTRACT

An additive to a flame reaction is provided which forms noncorrosive deposits on cooler metal surfaces which are more stable than $Na_2SO_4$ or $K_2SO_4$. The additive preferentially combines with the sodium or potassium, and sulfates of these will not be formed. By adding tungsten, tungsten salts or tungsten percursors to the flame, a complex sodium tungstate is produced on the surface of the cooler metal object in a dense form and corrosion is inhibited. The level of tungsten preferably present at an atomic concentration is equal to 1.5 to 2 times that of the sodium in the specific flame environment and possibly a little higher for potassium. The nature of the fuel and possible alkali reduction schemes will control the quantity and mixing method of the additive. The additive may be directly mixed into the fuel or injected into the burned gas regions of the combustion, Ta and Nb also appear as possible substitutes for W in the invention.

20 Claims, 15 Drawing Sheets

FIG. 4

Sodium Molybdate    Na$_2$MO$_4$

| Frequency | Rel. Int. |
|---|---|
| 891 | 100 |
| 809 | 45 |
| 381 | 7 |
| 304 | 61 |
| 117 | 11 |

FIG. 25

METHOD FOR THE PREVENTION OF HIGH TEMPERATURE CORROSION DUE TO ALKALI SULFATES AND CHLORIDES AND COMPOSITION FOR USE IN THE SAME

BACKGROUND OF THE INVENTION

1. Field of the Invention

The invention relates to a method and apparatus for the prevention of high temperature corrosion due to alkali sulfates and chlorides in boilers and other fired apparatus.

2. Description of the Prior Art

The problem of high temperature corrosion in boilers and other types of fired apparatus has been appreciated for a very long time. Mainly because the process was not understood, however, attempts to find a solution were empirical or engineering make-do's. There have been several feasible attempts to consider fuel additives (E. Raask, Mineral Impurities in Coal Combustion: Behavior, Problems and Remedial Measures (1985)) and such species as Magnesium, Calcium or Silica based compounds were added to little avail. Instead, for the last 20 years or so, attention has turned to accepting the presence of high temperature corrosion, but minimizing its effect on materials by developing superalloys or using coatings.

Even more recently in the United States, the higher temperature gas turbine developers have given in altogether and now will only burn very clean fuels such as natural gas. Coatings and alloys have been a great help but are only a partial solution as they all degrade with time. Chan, in a paper entitled "Coating Life Prediction under Cyclic Oxidation Combustion" ASME J. Eng. Gas Turbines Power 120:609 (1998) formulates a coating lifetime model. What is more, all coatings and alloys must be prefabricated. They do not regenerate in use, but gradually degrade in an irreversible manner before finally failing. They generally are somewhat exotic and tough materials. The coating described in Edwards, III et.al., "Inhibiting Coke Formation by Coating Gas Turbine Elements with Tungsten Disulfide," U.S. Pat. No. 5,240,741 (1993) is made of tungsten disulfide, and is meant to inhibit deposition of coke in a certain process. These coatings are not flame components and it is not possible to create them in a normal combustion process. They are made by other techniques, prefabricated and then used.

Coatings do not relate to flame chemistry or flame additives in any way. Consequently, patents relating to coatings or alloys are irrelevant to the invention. Just because tungsten metal may be a better metal surface than stainless steel has nothing to do with combustion chemistry. It cannot be made by deposition from any concoction of flame additives.

Morimoto et.al., "Method of Controlling Deactivation of Denitrating Catalyst," U.S. Pat. No. 4,831,942 (1989) did add, along with the major iron component, traces of vanadium and tungsten compounds to pulverized coal and oil fuels. This was intended to improve the performance of a nitric oxide emissions control catalyst that suffered from poisoning problems in the flue gases. Morimoto burned pulverized coal in a boiler, but the conditions do not impact the invention. Indications are, primarily due to the mixture of additive ingredients, that no corrosion protection was evident in Morimoto's boiler. In fact, if anything, indications are that corrosion was worse, and Morimoto had to keep additive levels low to minimize it. Morimoto's process is based largely on an addition of iron compounds that produce iron oxide particles in the burnt gases. Small traces of vanadium or tungsten compounds were found to be beneficial in enhancing the effectiveness of the iron oxide particles. Various statements are made in Morimoto's description, which teach away from the invention. Morimoto's additives enhanced corrosion and seems sensitive to particle size of the iron oxide; column 3, line 66. Vanadium or tungsten are added to the major iron ingredient only in small amounts, column 4, line 30. Adverse effects on the boiler were found due to these additives, column 4, line 37: The additives, sodium vanadate or sodium tungstate are suggested as the compounds of use, column 6, lines 25–31. Use of these compounds will increase the concentrations of sodium in the burned gases and enhance corrosion.

In the invention, gas phase levels of tungsten introduced for corrosion protection into a flame are in excess of those of the alkalis. In Morimoto low levels of tungsten were added along with the vanadium and iron, so that sodium concentrations were in excess of those of tungsten and no corrosion improvements could have been expected. See, column 12, line 64, where I was stated that additions of vanadium and tungsten compounds were kept very small to minimize the corrosion effects.

The invention relates to flame deposition of alkali metal salts, primarily sodium and potassium salts, onto cooled metal surfaces immersed in the burnt gases. This has been one of the first quantitative studies and previously only qualitative engineering reports have been available. Nothing was previously known of the formation mechanisms or what were the controlling parameters. Some preliminary results are summarized in an earlier paper (26th International Symposium on Combustion, 1996) and in a recent Poster Presentation (27th International Symposium on Combustion, 1998). However, these papers do not discuss the claimed invention, but only discuss the background of the invention.

BRIEF SUMMARY OF THE INVENTION

An additive to a flame reaction is provided which forms noncorrosive deposits on cooler metal surfaces which are more stable than $Na_2SO_4$ or $K_2SO_4$. The additive preferentially combines with the sodium or potassium, and sulfates of these will not be formed. By adding tungsten to the flame, a complex sodium tungstate is produced on the surface of the cooler metal object in a dense form and corrosion is inhibited. Deposition appears to closely reflect the relative thermodynamic stabilities of these salts and follows the order $Na_2WO_4 > Na_2SO_4 > NaCl > Na_2CO_3$. The flame sulfur or chlorine do not remain on the surface in association with the alkali metal. Tungsten can be added in any form desired to the combustion system that does not interfere with the intended purpose of the claimed invention. The flame processes all chemical tungsten precursors as equivalent sources of tungsten. Suitable salts that are readily available are ammonium metatungstate, ammonium, ammonium tungstate, tungsten hexacarbonyl, tungsten oxides, tungstic acid or any organo-tungsten compound. The level of tungsten preferably present at an atomic concentration is equal to 1.5 to 2 times that of the sodium in the specific flame environment and possibly a little higher for potassium. The nature of the fuel and possible alkali reduction schemes will control the quantity and mixing method of the additive. The additive may be directly mixed into the fuel or injected into the burned gas regions of the combustor. Ta and Nb also appear as possible substitutes for W in the invention.

The invention is thus a method of inhibiting corrosion in a flame reaction including an alkali metal comprising the steps of introducing an additive in the flame reaction, which additive forms a noncorrosive product with the alkali metal which is more chemically stable than sulfates of the alkali metal. The noncorrosive product is then deposited onto cooler metal structures in or proximate to the flame reaction in preference to or to the exclusive of more corrosive deposits which might otherwise be generated in the flame reaction.

The invention is also defined as the additive which is used for the foregoing method.

Generally, the alkali metal involved in the flame reaction is Na or K. The additive includes W in some form, but may also include Nb and/or Ta. When W is used, the noncorrosive product comprises a tungstate of the alkali metal, typically a sodium tungstate. Where Nb or Ta is added, then the noncorrosive product comprises $XNbO_3$ or $XTaO_3$ where X is the alkali metal.

The additive is preferably added to the flame reaction in a furnace, boiler, turbine or any combustion apparatus utilizing such fossil fuel. The additive may be added to the flame reaction in the form of ammonium metatungstate, paratungstate, or tungstate, tungsten hexacarbonyl, tungsten oxides, tungstic acid or any organo-tungsten compound.

When the additive includes W, the amount of atomic W in the additive is at least 1.5 to 2 times as much as the amount of atomic metal alkali in the flame reaction. When the flame reaction includes K, the amount of atomic W in the additive is at least 1.5 to 4 times as much as the amount of K in the flame reaction.

Thus, it can be said in general that in the illustrated embodiment, the additive includes at least one element selected from the group consisting of W, Nb and Ta, and the atomic amount of the element in the additive is at least 1.5 to 2 times as much as the atomic amount of metal alkali in the flame reaction.

The flame reaction is produced by combustion of a fuel. In one embodiment the additive is mixed in with the fuel prior to its combustion. In an other embodiment, the additive is injected into the combustion region or flame itself. Sulfur and chlorine can be included in the flame reaction without materially interfering with the desired end results.

The invention and its various embodiments are illustrated in the following drawings. The reactions depicted in the drawings are set forth for the purposes of illustration only and are expressly to be understood as not limiting the scope of the invention as defined in the following claims.

BRIEF DESCRIPTION OF THE DRAWINGS

FIG. 4 is a copy of the periodic table in which some of the candidates for a sodium molecule which is more thermodynamically stable than $Na_2SO_4$ are sought.

FIG. 25 is a periodic table which illustrates the $\log_{10}$ (equilibrium constant) values for the reaction:

Figure 1:
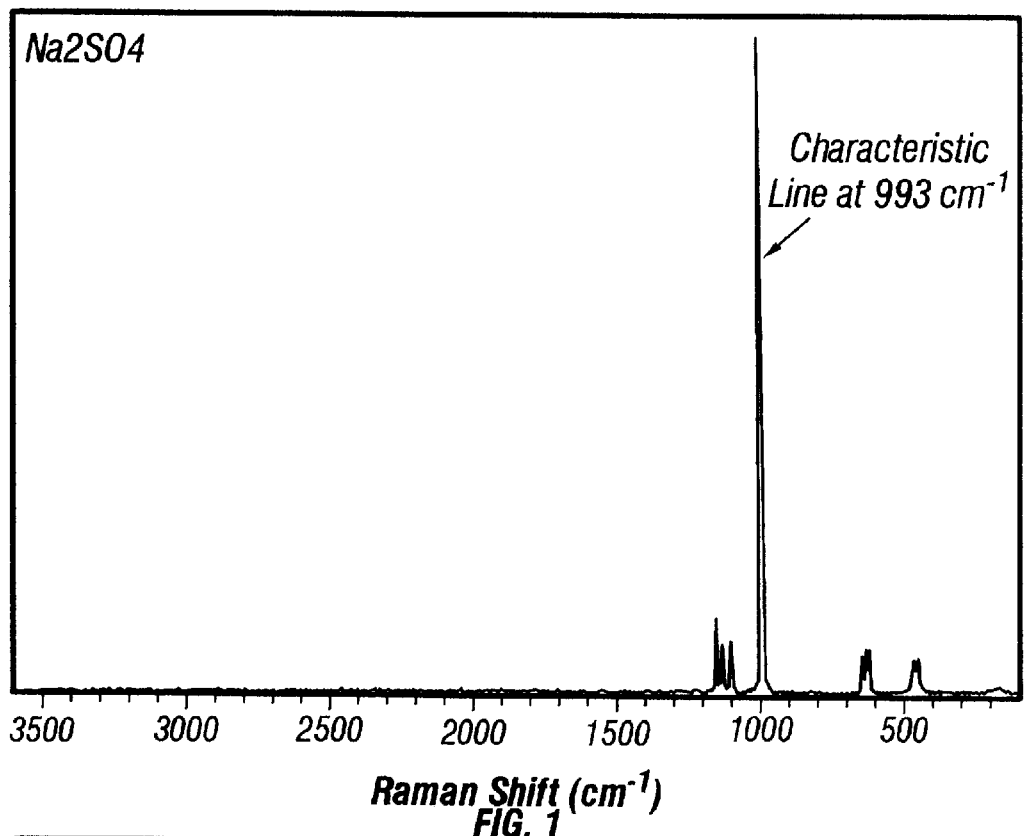
FIG. 1 is a graph of the Raman spectrum of a pure sample of $Na_2SO_4$ showing its characteristic frequencies, in particular a very strong line at 993 cm$^{-1}$.

for various metals.

The invention and its various embodiments as illustrated in the foregoing graphs and tables can be understood by turning to the following detailed description.

DETAILED DESCRIPTION OF THE PREFERRED EMBODIMENTS

It has been found according to the invention that the flame deposition process is totally controlled by the sodium in the reaction, and the rates depend in a linear manner on the flame concentration of total sodium content. It is to be expressly understood that sodium will be discussed herein as the representative alkali metal, but that the invention is not limited to just sodium. Any alkali metal could be similarly treated. The nature of the flame sodium is irrelevant and the flame processes all sodium salts as equivalent sources to each other. The sodium deposits in a very efficient manner on any surface immersed in the flame that is cooler than about 1250 K (1790° F.). Rates of deposition are independent of surface temperature up to about 1000 K and then fall off due to ablation processes. The alkali has a preference, however, as to what it forms on the surface. If sulfur is present in the flame at concentrations down to almost one half that of the sodium, $Na_2SO_4$ is produced in a pure form.

The flame burner system used in the experiments discussed below is conventional and has been described previously in Steinberg, et.al., *Twenty-Sixth Symposium (International) on Combustion*, The Combustion Institute, Pittsburgh, Pa., 1996, pp. 1835–1843, and provides for a well defined one dimensional atmospheric pressure flame. $C_3H_8/O_2/N_2$ and $H_2/O_2/N_2$ flames have been used over a range of fuel rich and lean equivalence ratios. In order to produce measurable probe deposition rates in a reasonable length of time (generally 1–6 hours), alkali flame concentrations of 10–30 ppm have been found most adequate. Metals are introduced as an aqueous aerosol from an ultrasonic nebulizer and solution strengths of about 0.05 N produce the required densities with minimal loss in the heated delivery line or heated burner. Solutions of $NaNO_3$, $Na_2S_2O_3$ (as a source of both sodium and sulfur), $KNO_3$, ammonium metatungstate $(3(NH_4)_2WO_4 \cdot 9WO_3)$, and $Ca(NO_3)_2$ have been used and found to be mutually compatible. When applicable, a trace addition of potassium was added to sodium solutions, K:Na=0.5%, to facilitate optical monitoring of the optically thin potassium resonance line emission as a measure of constant nebulizer delivery to the flame. When other metals have been added together with sodium, suitable soluble salts were used. In cases where no water soluble salts are available, such as with tantalum and niobium, experiments were formulated to use their sodium salts, $NaTaO_3$ and $NaNbO_3$, in a different manner. Flows were controlled by calibrated electronic mass meters. Small quantities of sulfur and chlorine were added using certified cylinder mixtures of 0.1% $SO_2$ in $N_2$, and 514 ppm $Cl_2$ in $N_2$.

Several cylindrical collection probes have been used. These generally are about 12 mm in diameter and essentially interact with all of the seeded inner core burner flow at some point. They are of Inconel-600 stainless steel with a central channel for air or water cooling and have a built in thermocouple to monitor the surface temperature. One was very tightly clad with a two micron thick foil of platinum The probe was mounted horizontally in the vertical flows and the burner raised or lowered by a computerized stepper-motor. In this way samples could be collected at various downstream times. In the propane flames largely used in this program, times would generally be of the order of 1–10 ms from the reaction zone. Probe temperatures have been in the 600–900 K range.

Probe deposits have been characterized using a Nicolet Fourier transform Raman spectrometer that uses a 1.06 µm excitation source. Occasionally, an alternate home built system also has been used with the shorter wavelength $Ar^+$ laser line excitation. This is necessary at times if crystal luminescence interferes with the Raman spectra. This was the case particularly with $CaSO_4$ and several other metal systems, when using the longer wavelength laser. After collecting a deposit on the probe, the flame is extinguished by ultrapure $N_2$ and the probe is cooled in such a flow. The sample then is removed while remaining in this flow and sealed in a capillary glass tube for analysis. Contact with moisture or air is minimal. Rates of deposition in this system are about 2 mg/hr of sodium and generally 5 mg are sufficient for an accurate spectral analysis. Rates of deposition were measured by dissolving the deposit off the probe and analyzing the solution for Na, K, S and other metals utilizing a Thermo Jarrell Ash High Resolution ICP using carefully matched calibration solutions. Analysis for certain metals such as Ma, K and Ca also were run on a flame photometric Beckman analytical burner and values compared favorably with those acquired with the ICP. In such cases, monitoring sensitivity was very high, and accurate, reproducible results could be obtained for deposits collected in one hour. Chlorine content was analyzed using an Orion Chloride Electrode calibrated against standard solutions.

Figure 2:
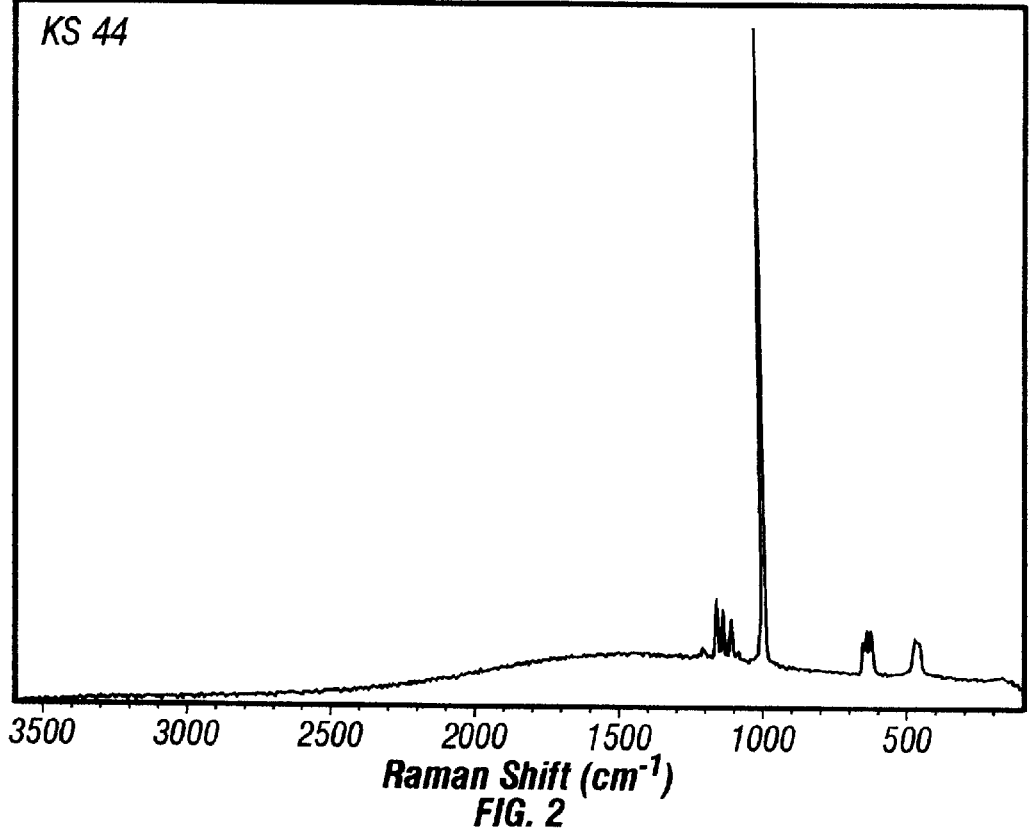
FIG. 2 is a graph of the Raman spectrum of a flame deposit collected on a stainless steel (Inconel) probe at 725 K.

FIG. 1 is a graph of the Raman spectrum of a pure sample of $Na_2SO_4$ showing its characteristic frequencies, in particular a very strong line at 993 $cm^{-1}$. FIG. 2 is a graph of the Raman spectrum of an oxygen rich, propane-air flame deposit collected on a stainless steel (Inconel) probe at 725 K in the presence of 500 ppm $SO_2$ and about 25 ppm Na. Comparison of FIGS. 1 and 2 show that the deposit is essentially pure $Na_2SO_4$.

Figure 3:
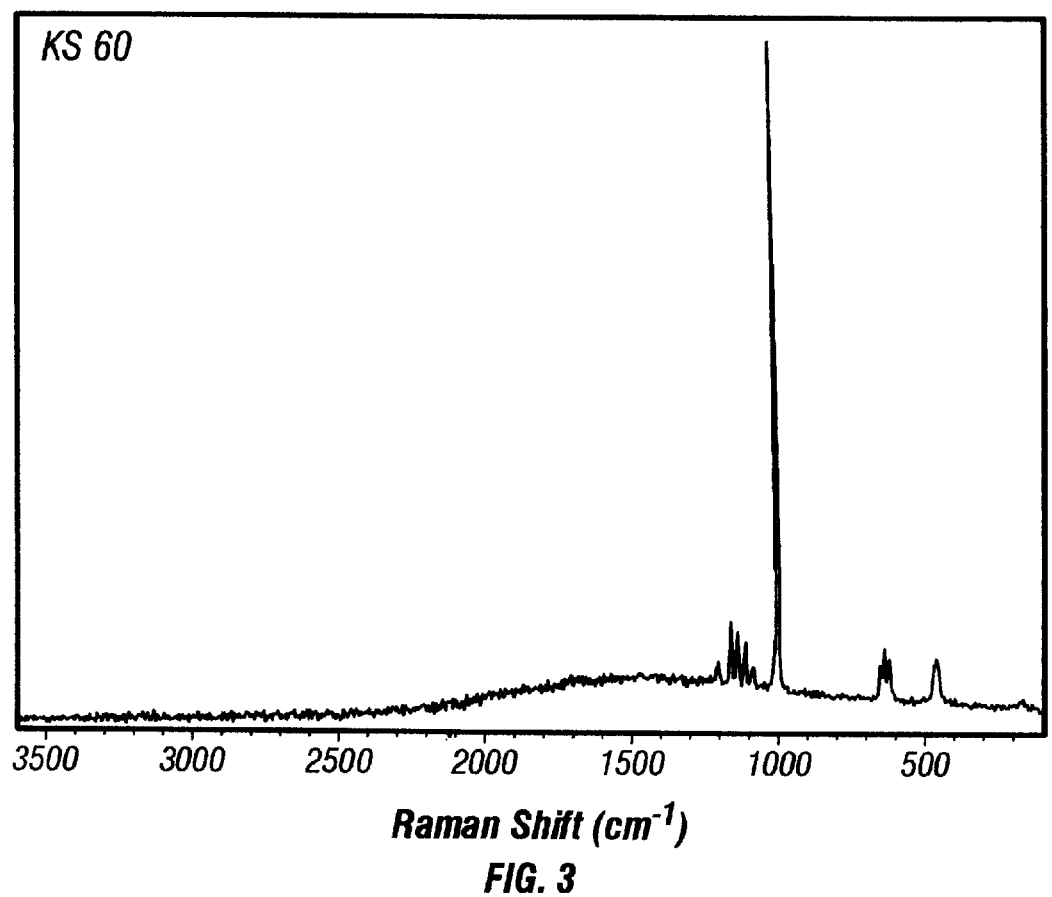
FIG. 3 is a graph of the Raman spectrum of a flame deposit collected on a stainless steel (Inconel) probe at 725 K similar to FIG. 2, but with the flame sulfur content reduced to be equal to that of the flame sodium.

If sulfur is absent, the next preference is for chlorine, forming NaCl, and if not, it turns to carbon and produces $Na_2CO_3$. This preference of $Na_2SO_4>NaCl>Na_2CO_3$ follows thermodynamic predictions. Rates are not controlled in any way by the accommodating component and are the same whichever is formed. If there is an insufficient amount of one component, the sodium uses that to the full and then fills in with the next. FIG. 3 is a graph of the Raman spectrum of a flame deposit collected on a stainless steel (Inconel) probe at 725 K similar to FIG. 2, but with the flame sulfur content reduced to be equal to that of the flame sodium. Comparison of FIGS. 2 and 3 show that the flame reaction is insensitive to the sulfur concentration. Sulfur has to be less than one half that of sodium before NaCl or $Na_2CO_3$ begins to be additionally formed, assuming that these components are present.

If a deposit of $Na_2CO_3$ is first laid down on the probe and then sulfur is added to the flame, the whole deposit converts to sulfate. However, if a sulfate is first deposited and then the sulfur turned off, a carbonate will continue to deposit on top of it.

Figure 4:
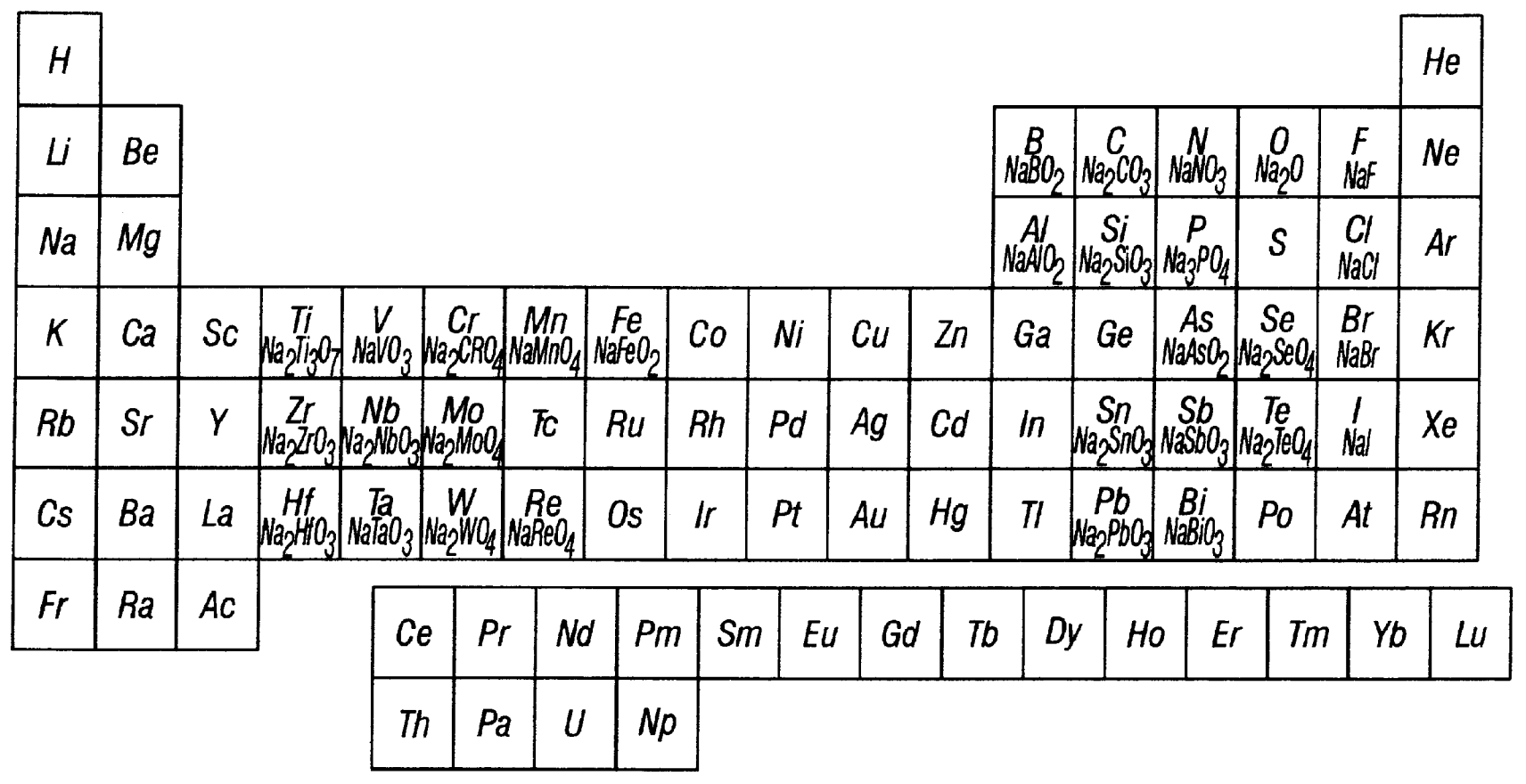
Figure 5:
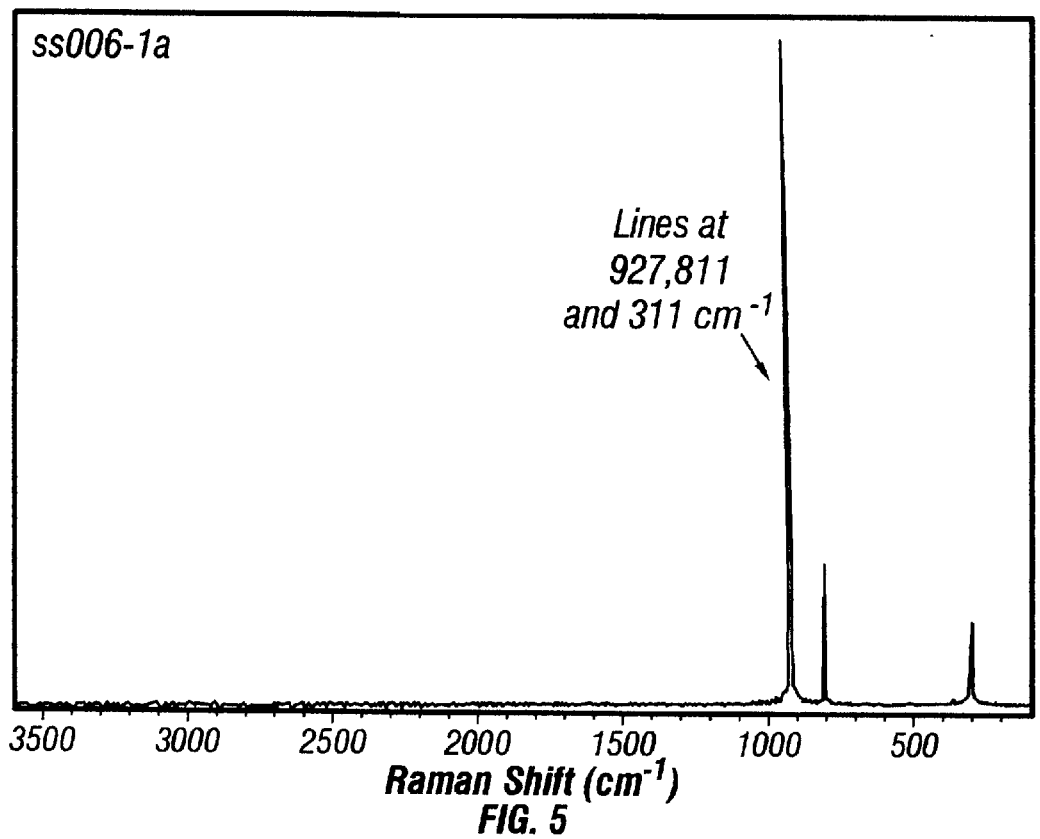
FIG. 5 is a graph of the Raman spectrum of a pure sample of $Na_2WO_4$ showing its characteristic frequencies, in particular a very strong line at 927 cm$^{-1}$ and secondary lines at 811 cm$^{-1}$ and 311 cm$^{-1}$.

Conversions can occur up the chain of preference, but are irreversible. Moreover, the deposition process is independent of the flame and only uses it as a source of ingredients. Consequently, there are no dependence on flame type, stoichiometry, temperature or state of flame equilibration. The behavior of potassium closely follows that of sodium. FIG. 4 is a copy of the periodic table in which some of the candidates for a sodium molecule which is more thermodynamically stable than $Na_2SO_4$ is sought. By experiment, tungsten is shown as the optimal choice. $Na_2WO_4$ appears to be more stable than $Na_2SO_4$ and NaCl in combustion deposition conditions. Niobium and tantalum are potential alternatives, forming $NaNbO_3$ or $NaTaO_3$. Niobium and tantalum, however, are less economically attractive. FIG. 5 is a graph of the Raman spectrum of a pure sample of $Na_2WO_4$ showing its characteristic frequencies, in particular a very strong line at 927 $cm^{-1}$ and secondary lines at 811 $cm^{-1}$ and 311 $cm^{-1}$.

The same behavior occurs with any fuel. High temperature corrosion results largely from the alkali sulfates, primarily those of sodium and potassium, which are present in fossil and biomass fuels. It is a major problem in furnaces, boilers, turbines and any combustion system utilizing such fuels. Combustion technology in general is presently being limited and controlled by this problem. The sulfate fluxes the metal surface, removing protective oxide layers and reacts with the metal components opening it up to further attack by sulfur and chlorine. The metal is corroded away and eventually mechanically fails.

The present research has led to a solution, which is not foreclosed in any of the prior art references mentioned above. If something can be found that is more stable than $Na_2SO_4$ or $K_2SO_4$, it is apparent that it will preferentially combine with the sodium or potassium, and these sulfates will not be formed. There are, however, extremely few possibilities because the alkali sulfates are thermodynamically very stable, and represent the most stable of all the sulfates. Stabilities increase on going from lithium to sodium, to potassium, rubidium, with cesium sulfate being the most stable of all the elements.

Nevertheless, according to the invention one solution has been found that prevents the formation of the sulfate and is benign to metal surfaces. By adding tungsten to the flame, a complex sodium tungstate is produced on the surface of the cooler metal object in a dense form and corrosion is inhibited. The flame sulfur or chlorine do not remain on the surface in association with the alkali metal.

Tungsten can be added in any form desired that does not interfere with the intended purpose of the claimed invention to the combustion system. The flame processes all such chemical tungsten precursors as equivalent sources of tungsten. Suitable salts that are readily available are ammonium metatungstate, ammonium paratungstate, ammonium tungstate, tungsten hexacarbonyl, tungsten oxides, tungstic acid or any organo-tungsten compound. The use of the ammonium salts may be ruled out on environmental grounds as they are also a source of fuel nitrogen and have the potential for modifying $NO_x$ emission levels in the flame reaction.

The level of tungsten preferably present at an atomic concentration is equal to 1.5 to 2 times that of the sodium in the specific flame environment and possibly a little higher for potassium. As the concentration of these alkalis generally can be reduced now down to a parts-per-million level, this implies a need for tungsten addition that may be of the order of only one or several pounds for 100 tons of fuel. The nature of the fuel and possible alkali reduction schemes will control the quantity and mixing method of the additive. The additive may be directly mixed into the fuel or injected into the burned gas regions of the combustor. Results have indicated successful operation in sulfur and chlorine flame environments.

An alkali molecule was needed that was more stable in the flame/deposition environment than the sulfate. FIG. 4 illustrated that sodium compounds that can be formed with other elements of the periodic table. These were assessed by three methods. Firstly, a thermal stability to temperatures of at least 1000 K was necessary. Secondly, wherever possible, thermodynamic equilibrium calculations were made to directly compare their stabilities to $Na_2SO_4$ or $K_2SO_4$. Finally, flames were burned containing the alkali metal, the metal additive, sulfur and chlorine to see if $Na_2SO_4$ remained the predominant alkali deposit. In two cases, namely niobium and tantalum, there are no water soluble salts so that their addition from a nebulizer in the normal experimental testing was not possible. In these two cases, thin layers of $NaNbO_3$ and $NaTaO_3$ salts were coated on probes and then immersed into sulfur bearing flames to see if conversions to $Na_2SO_4$ occurred in the 900 K regime.

Figure 6:
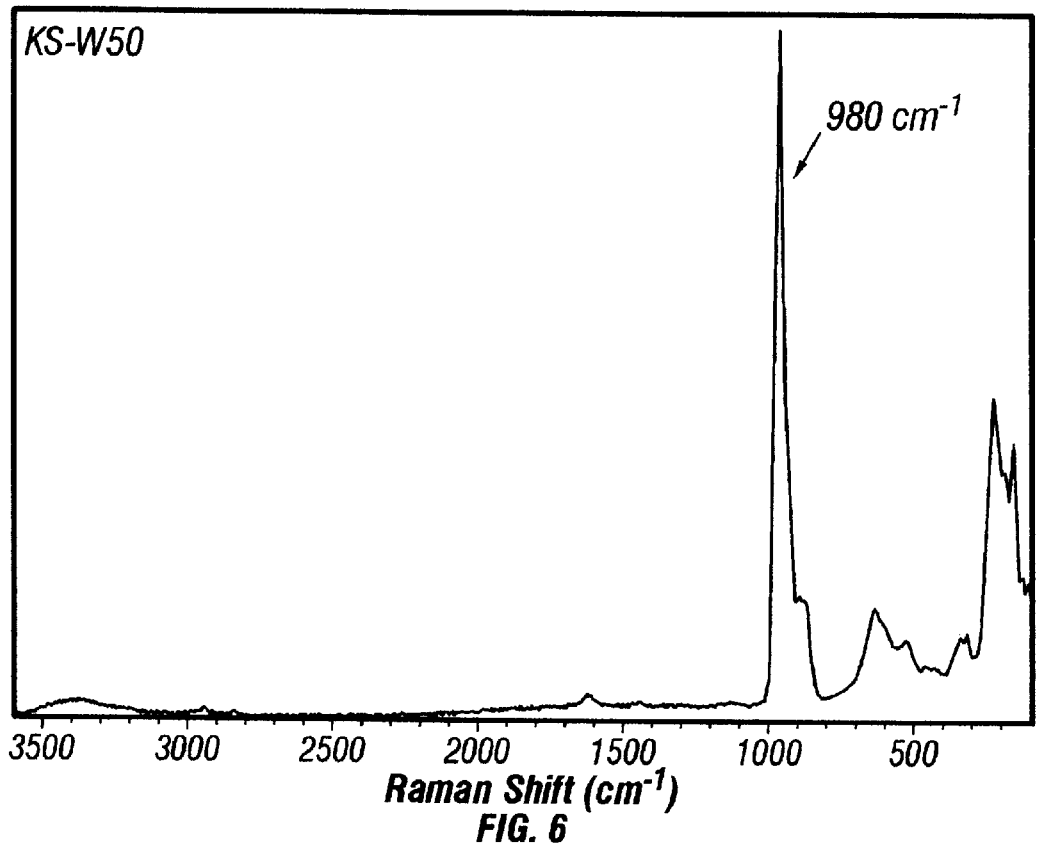
FIG. 6 is a graph of the Raman spectrum of a pure sample of sodium metatungstate, $3Na_2WO_4 \cdot 9WO_3$.
Figure 7:
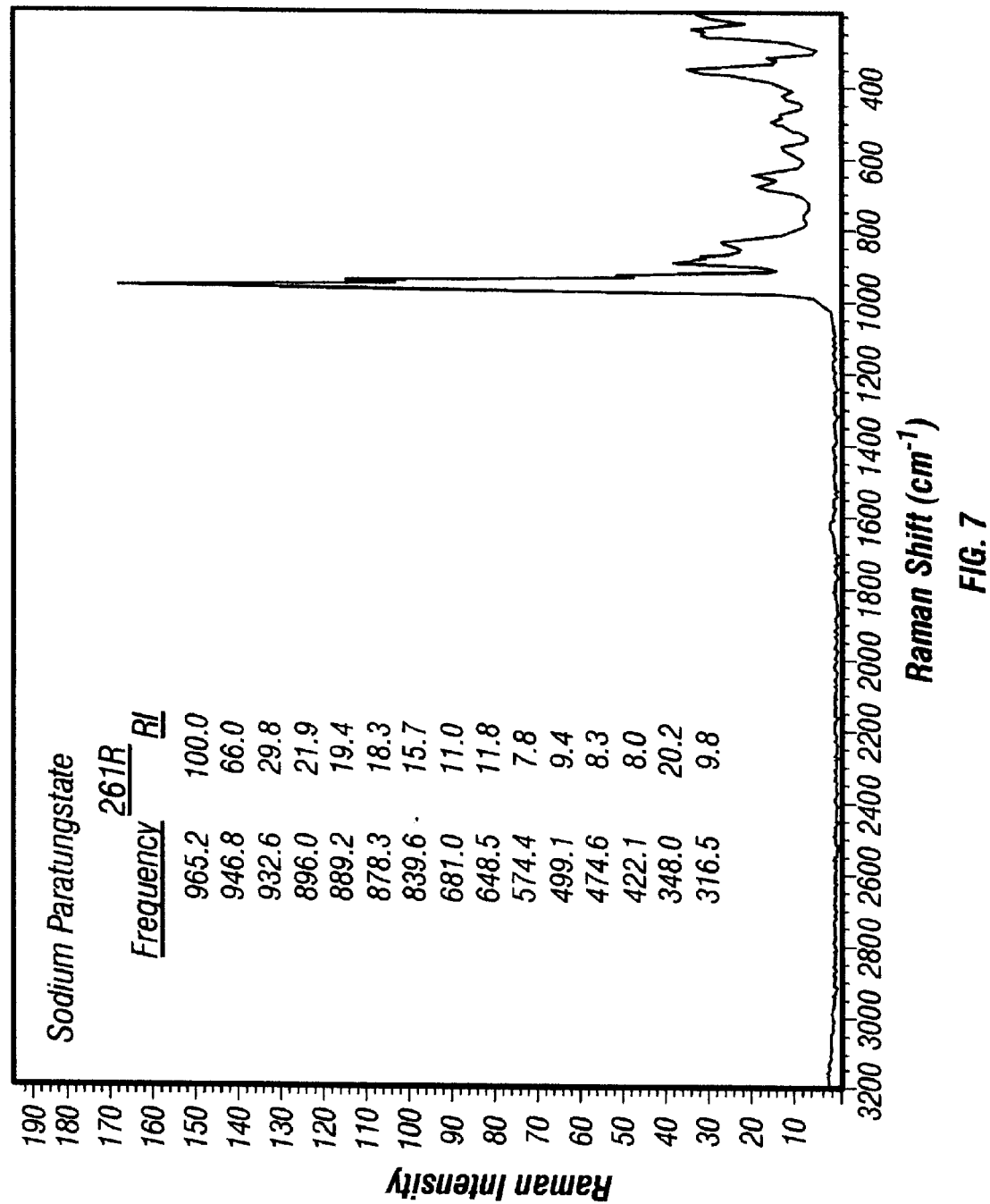
FIG. 7 is a graph of the Raman spectrum of sodium paratungstate, $3Na_2WO_4 \cdot 4WO_3$, 16 $H_2O$.

FIG. 6 is a graph of the Raman spectrum of a pure sample of sodium metatungstate, $3Na_2WO_4.9WO_3$. Sodium tungstate can incorporate additional $WO_3$ molecules into its crystalline structure to form more complex and more stable tungstates. FIG. 7, for example, is a graph of the Raman spectrum of sodium paratungstate, $3Na_2WO_4.4WO_3$, 16 $H_2O$.

Figure 8:
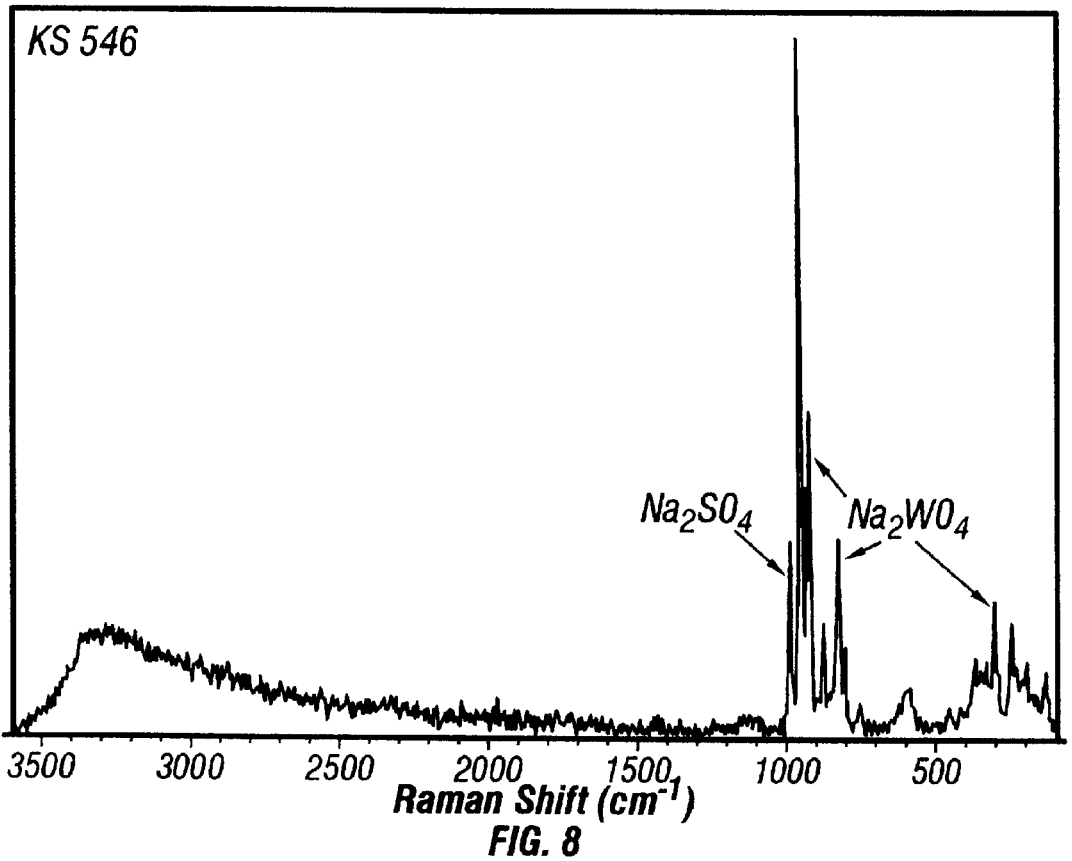
FIG. 8 is a graph of the Raman spectrum of a deposit from a lean fuel, $C_3H_8$ burned in the presence of oxygen, nitrogen in the ratios of 0.9/5/16 and 75 ppm of $SO_2$ with Na:W at 2:1 with Na at about 25 ppm.

In a first experiment, as shown in FIG. 8, which is a graph of the Raman spectrum of a deposit from a lean fuel, $C_3H_8$ burned in the presence of oxygen, nitrogen in the ratios of 0.9/5/16 with 75 ppm of $SO_2$ and with Na:W at 2:1 with Na at about 25 ppm using a platinum probe at 850 K, there are slight amounts of $Na_2SO_4$ evident. Most of the deposit takes the form of $Na_2WO_4$ and more complex tungstates. No $WO_3$ is evident.

Figure 9:
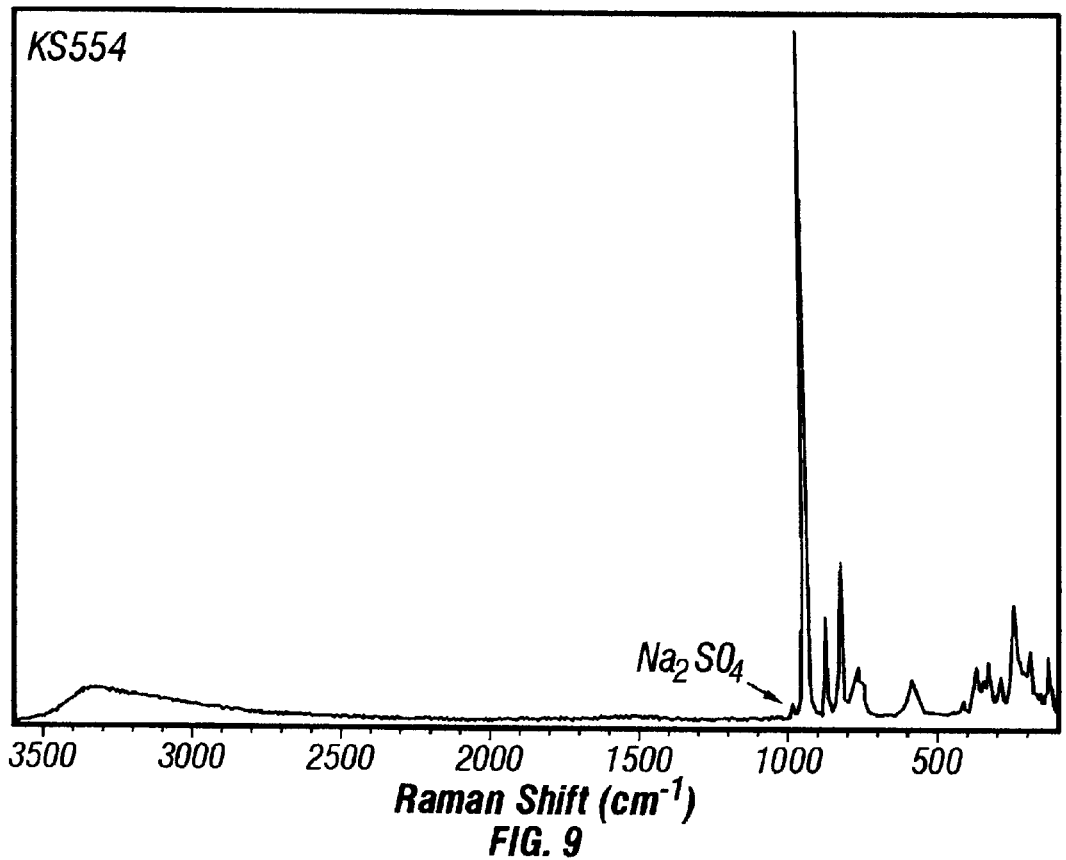
FIG. 9 is a graph of the Raman spectrum of a deposit from a lean fuel similar to FIG. 8 with Na:W at 1:1 with Na at about 20 ppm.
Figure 10:
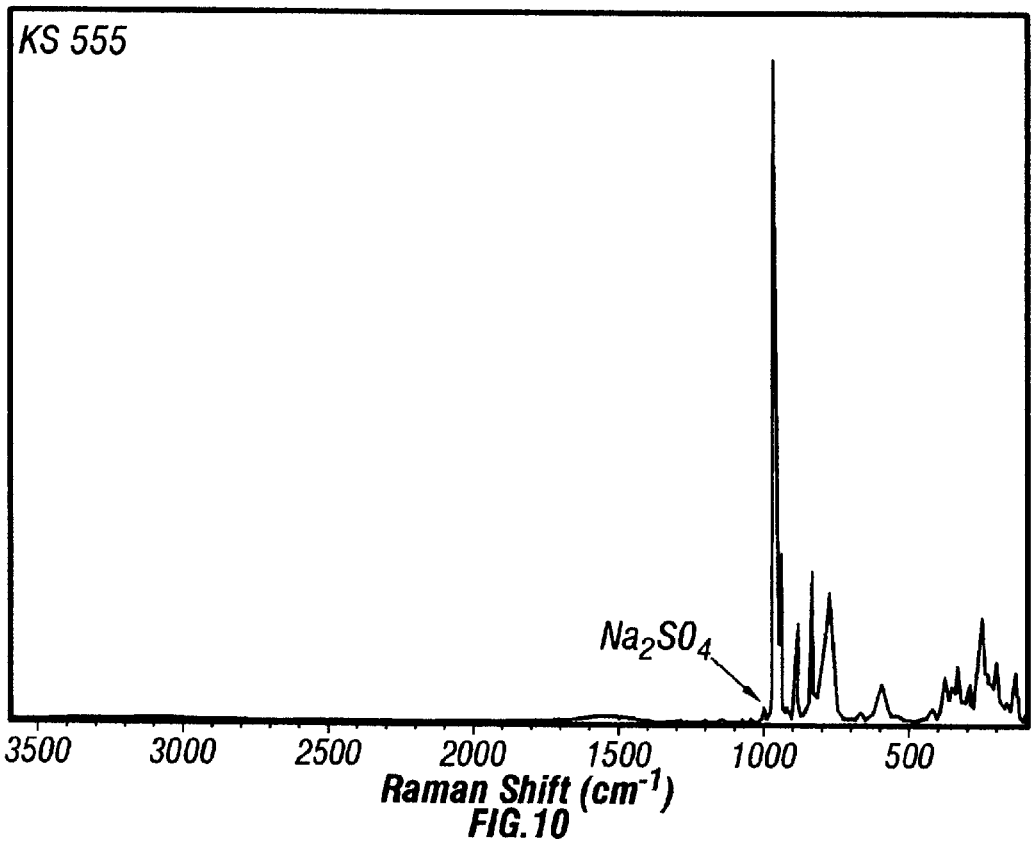
FIG. 10 is a graph of the Raman spectrum of a deposit from a lean fuel similar to FIG. 9 but also with 74 ppm $Cl_2$.
Figure 11:
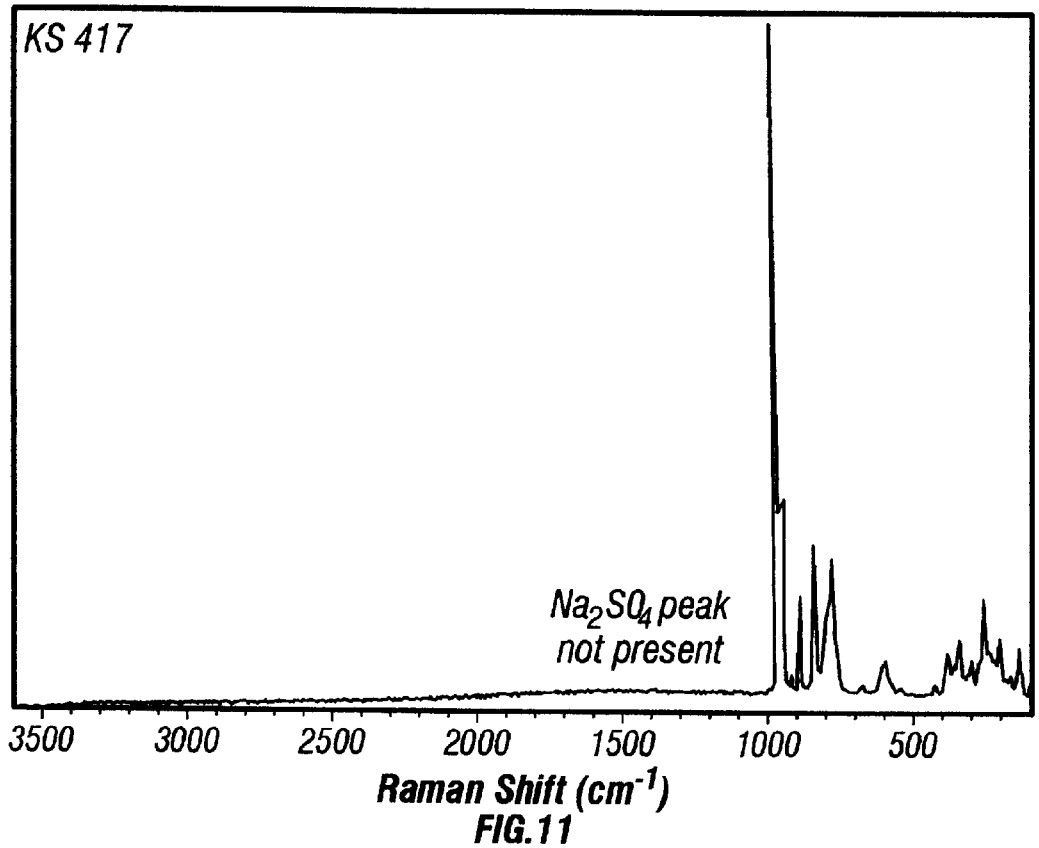
FIG. 11 is a graph of the Raman spectrum of a deposit from a lean fuel similar to FIGS. 8 and 9 with Na:W:S at 1:1.5:1 with Na at about 20 ppm.

In a second experiment similar to that shown in FIG. 8, the amount of tungsten was increased to equal the amount of sodium and the sulfur is in a slight excess. FIG. 9 is a graph of the Raman spectrum of the results which show a marked attenuation of $Na_2SO_4$ formation. This experiment was repeated with chlorine added. FIG. 10 is a graph of the Raman spectrum of the resulting deposit which shows no effect from the chlorine. The experiment was repeated again with sulfur added in an amount equal to the amount of sodium and tungsten was increased to 1.5 times the amount of sodium. The deposits on a platinum probe at 900 K are shown in FIG. 11, which is a graph of the Raman spectrum of the deposit. No evidence of $Na_2SO_4$ formation is seen.

Figure 12:
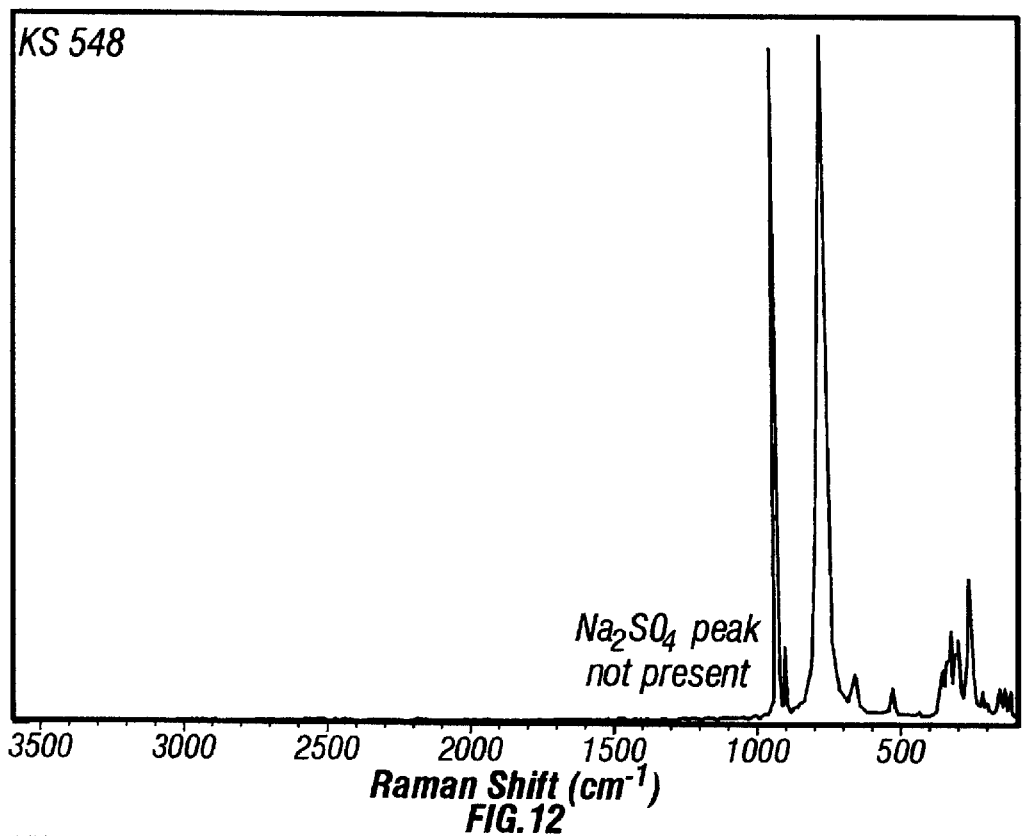
FIG. 12 is a graph of the Raman spectrum of a deposit from a lean fuel similar to FIGS. 8 and 9 with 25 ppm of $SO_2$ with Na:W at 1:2 with Na at about 20 ppm.
Figure 13:
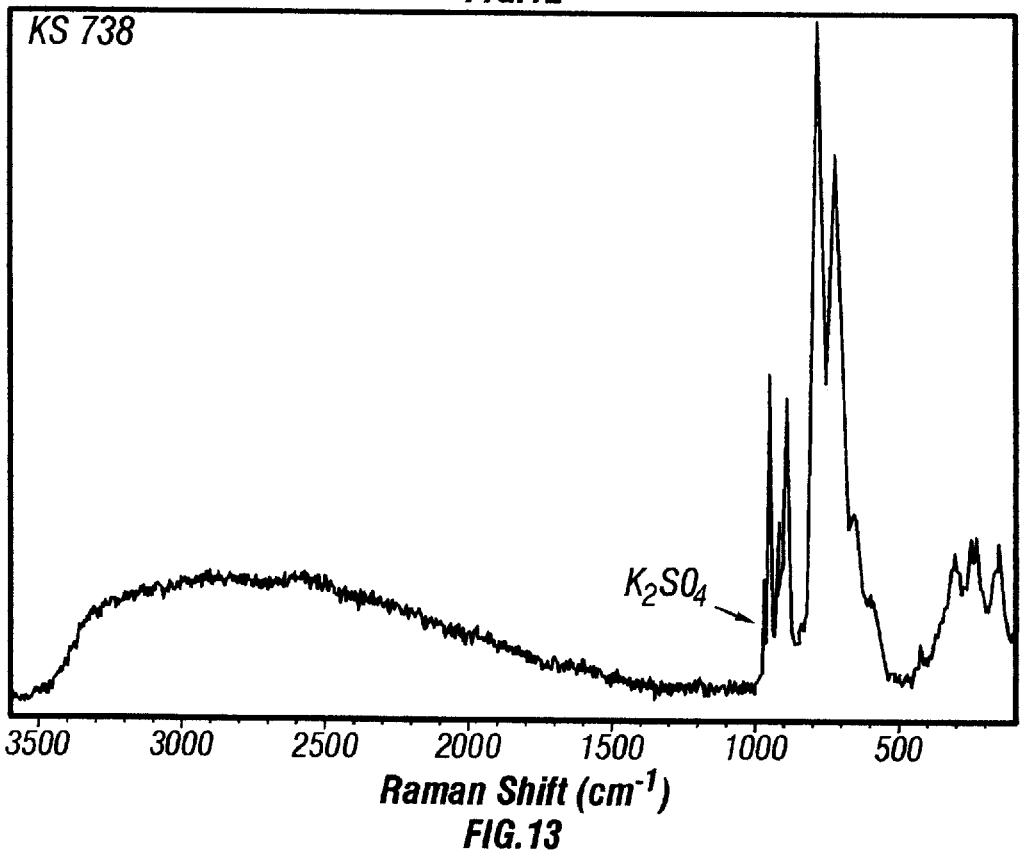
FIG. 13 is a graph of the Raman spectrum of a deposit from a lean fuel similar to FIGS. 8 and 9 with 125 ppm of $SO_2$ and 50 ppm $Cl_2$ with K:W at 1:1 with K at about 20 ppm.

The experiment was then conducted in a lean fuel similar to FIGS. 8 and 9 with 25 ppm of $SO_2$ with Na:W at 1:2 with Na at about 20 ppm. FIG. 12 is a graph of the Raman spectrum of the deposit on a platinum probe at 850 K. There is no evidence of any $Na_2SO_4$ deposit. The experiment was repeated with the amount of $SO_2$ increased and chlorine added. Potassium and tungsten were combined as additives. The results are shown in FIG. 13 which is a graph of the Raman spectrum of a deposit with 125 ppm of $SO_2$ and 50 ppm $Cl_2$ with K:W at 1:1 with K at about 20 ppm. Under these conditions, a small amount of $K_2SO_4$ is formed together with the complex potassium tungstates. A slightly larger quantity of tungsten is thus needed to fully inhibit $K_2SO_4$ formation.

Figure 14:
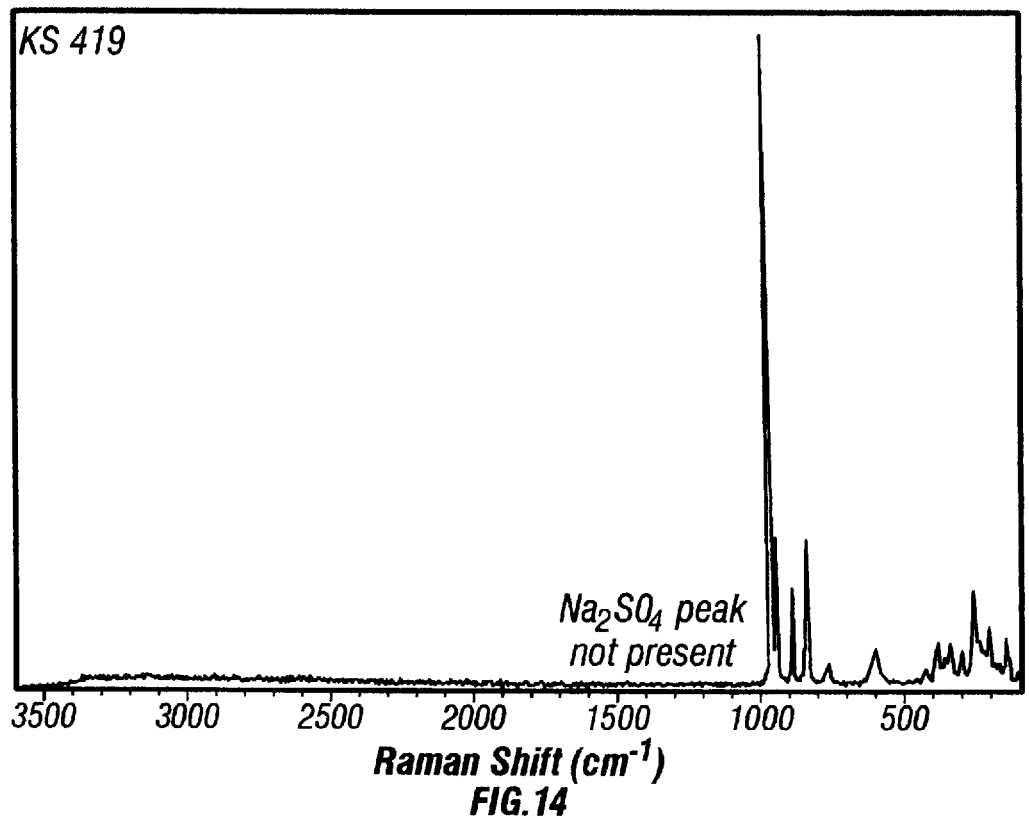
FIG. 14 is a graph of the Raman spectrum of a deposit from a lean fuel burned first with Na:S at 1:1 (Na=25 ppm) for two hours and then for an additional two hours with Na:S:W=1:1:1.5.
Figure 15:
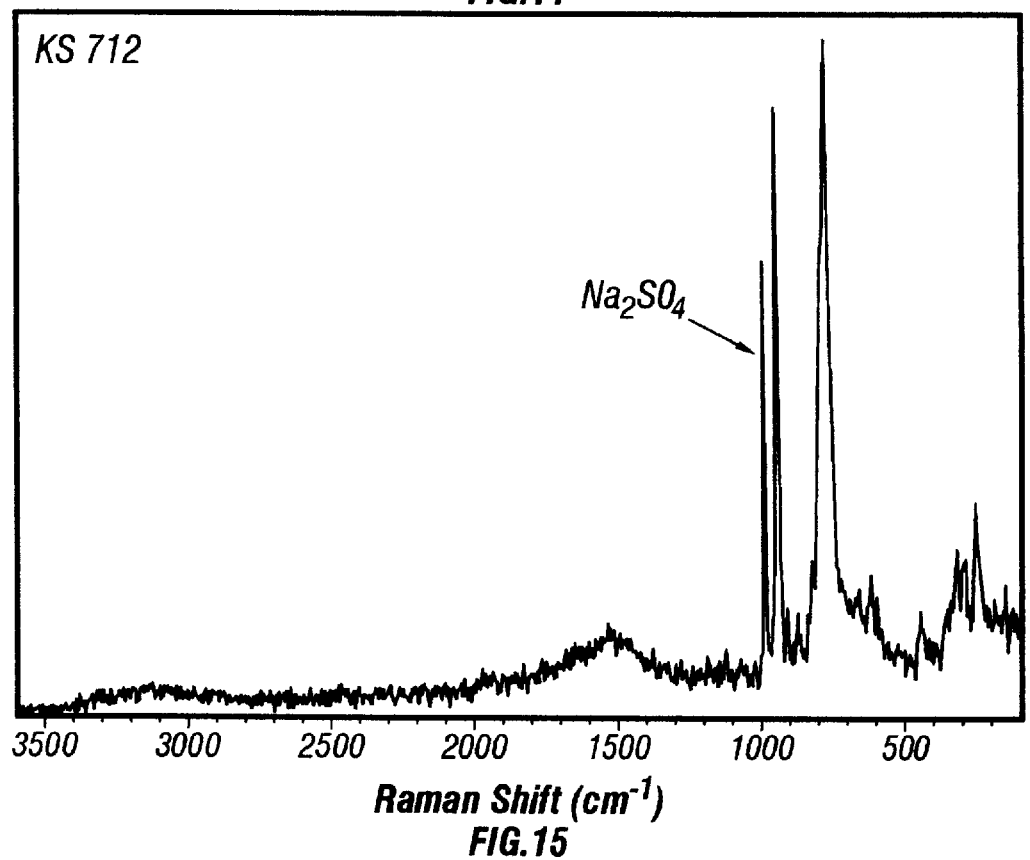
FIG. 15 is a graph of the Raman spectrum of a deposit from a lean fuel burned similarly to that in FIG. 14 but with the two periods in reverse. Firstly with Na/SW present, then followed with only Na/S present.

FIG. 14 is a graph of the Raman spectrum of a deposit from a lean fuel burned first with Na:S at 1:1 (Na=25 ppm) for two hours and then for an additional two hours with Na:S:W=1:1:1.5. As expected a deposit of $Na_2SO_4$ was collected for the first two hours. When the tungsten was introduced the initial $Na_2SO_4$ deposit was converted and overlaid to form a sample of tungstate which is identical to the deposit shown in FIG. 9. Similar behavior was obtained with both a stainless steel (KS419) or platinum probe at 900 K. The experiment of FIG. 14 was repeated, but in reverse order. The results are shown in FIG. 15 using a platinum probe at 825 K. The initial deposit of tungstate is overlaid with $Na_2SO_4$ and their mixture results.

Figure 16:
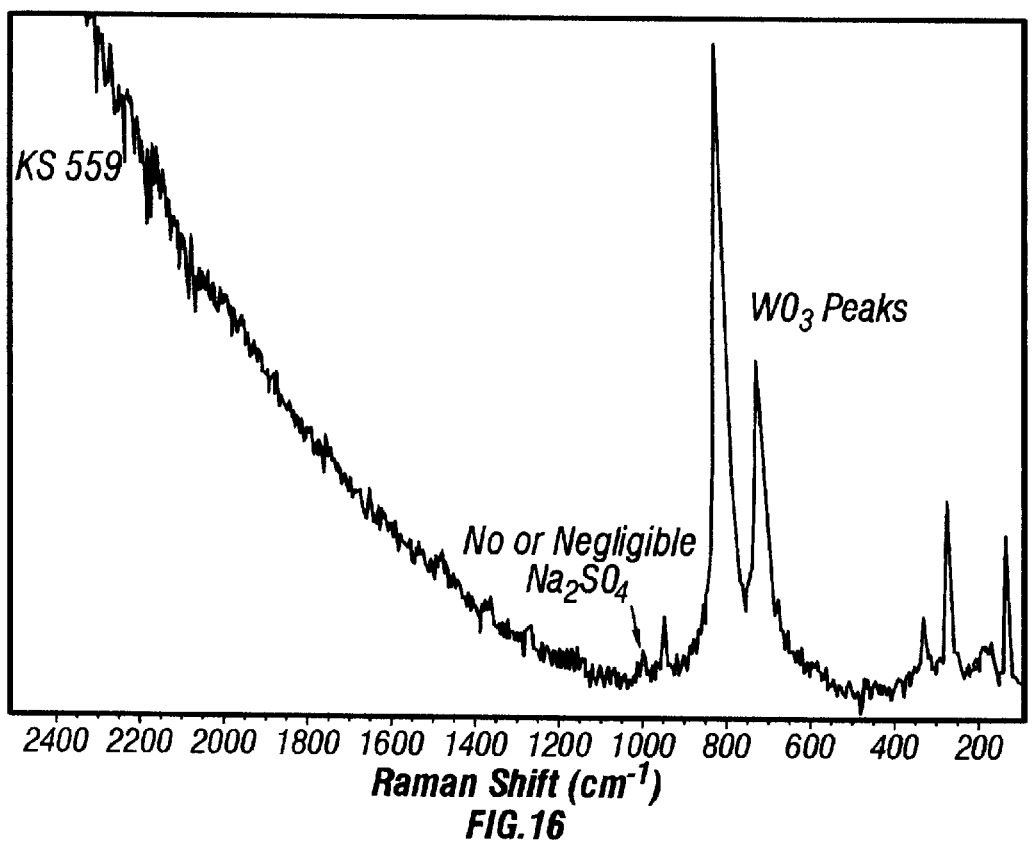
FIG. 16 is a graph of the Raman spectrum of a deposit from a lean fuel burned first with Na=25 ppm, $Cl_2$=25 ppm and $SO_2$=25 ppm for five hours and then for an additional 2.5 hours with W replacing Na.
Figure 17:
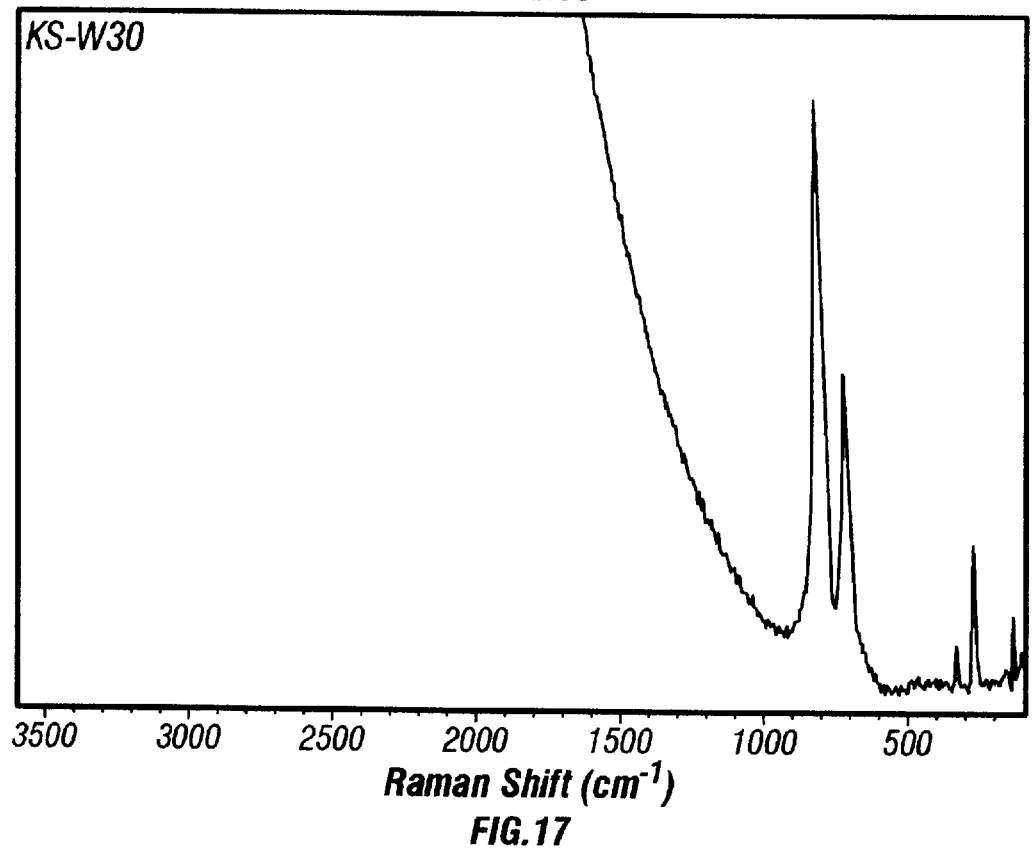
FIG. 17 is a graph of the Raman spectrum of a deposit from a pure sample of $WO_3$.

FIG. 16 is a graph of the Raman spectrum of an experiment in which a deposit was obtained from a lean fuel burned first with Na=25 ppm, $Cl_2$=25 ppm and $SO_2$=25 ppm for 5 hours and then burned for an additional 2.5 hours with W replacing Na. The initial deposit of $Na_2SO_4$ is converted and deposits of $WO_3$ occur. FIG. 17 is a graph of the Raman spectrum of a deposit from a pure sample of $WO_3$.

Figure 18:
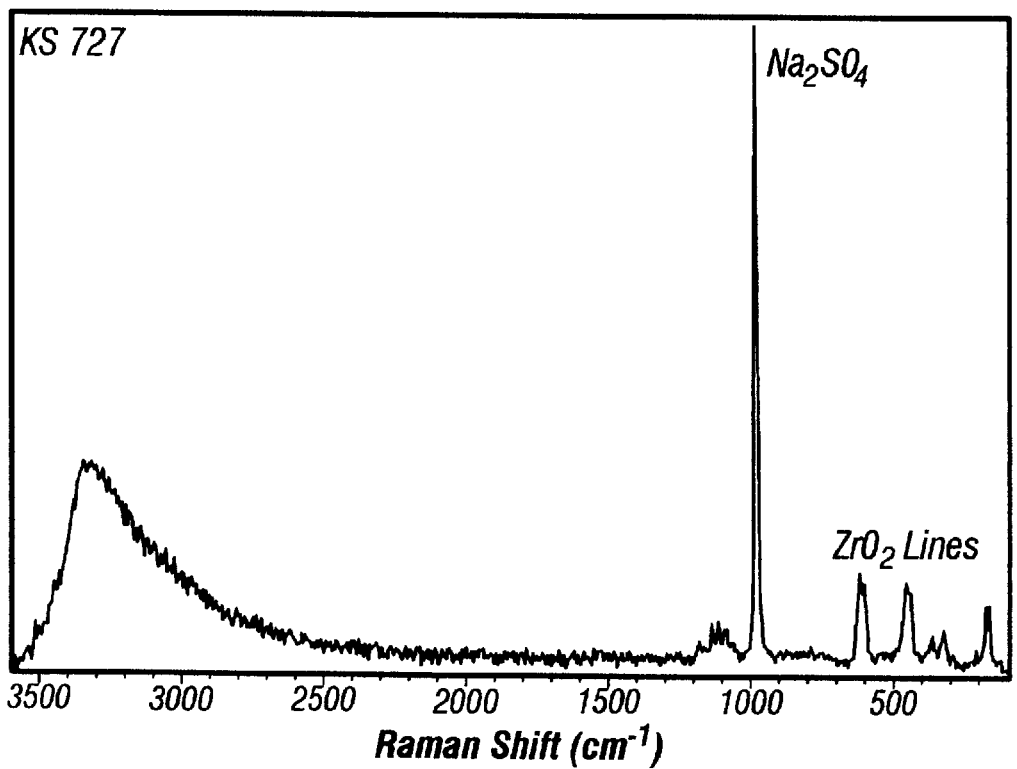
FIG. 18 is a graph of the Raman spectrum of a deposit from a lean fuel burned with Na:Zr at 2:1 ($SO_2$=75 ppm).

In another experiment zirconium was tried. FIG. 18 is a graph of the Raman spectrum of a deposit from a lean fuel burned with Na:Zr at 2:1 ($SO_2$=75 ppm). What resulted were deposits of $Na_2SO_4$ and monoclinic $ZrO_2$ in this oxygen rich flame of $C_3H_8/O_2/N_2$=0.9/5/16 on a platinum probe at 850 K. There is no evidence of any formation of $Na_2ZrO_3$. For this reason Zr is ruled out as an optimal additive.

Figure 19:
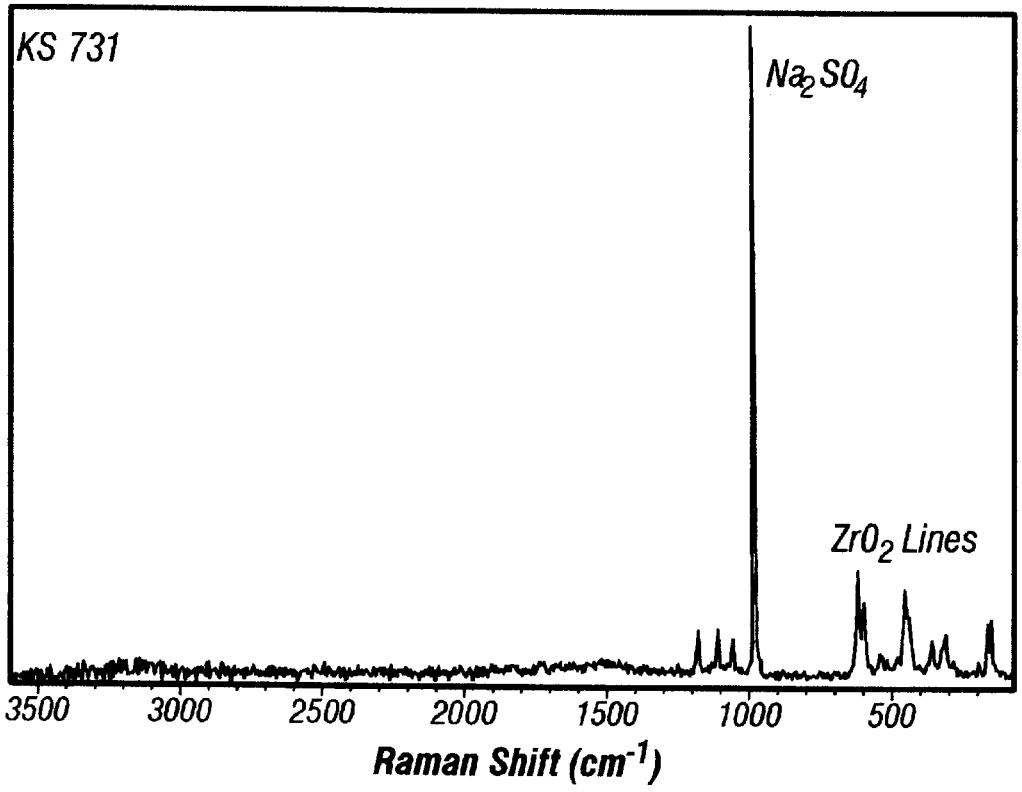
FIG. 19 is a graph of the Raman spectrum of a deposit from a rich fuel ($C_3H_8/O_2/N_2$=1.2/5/20) burned with Na:Zr at 2:1 ($SO_2$=40 ppm).
Figure 20:
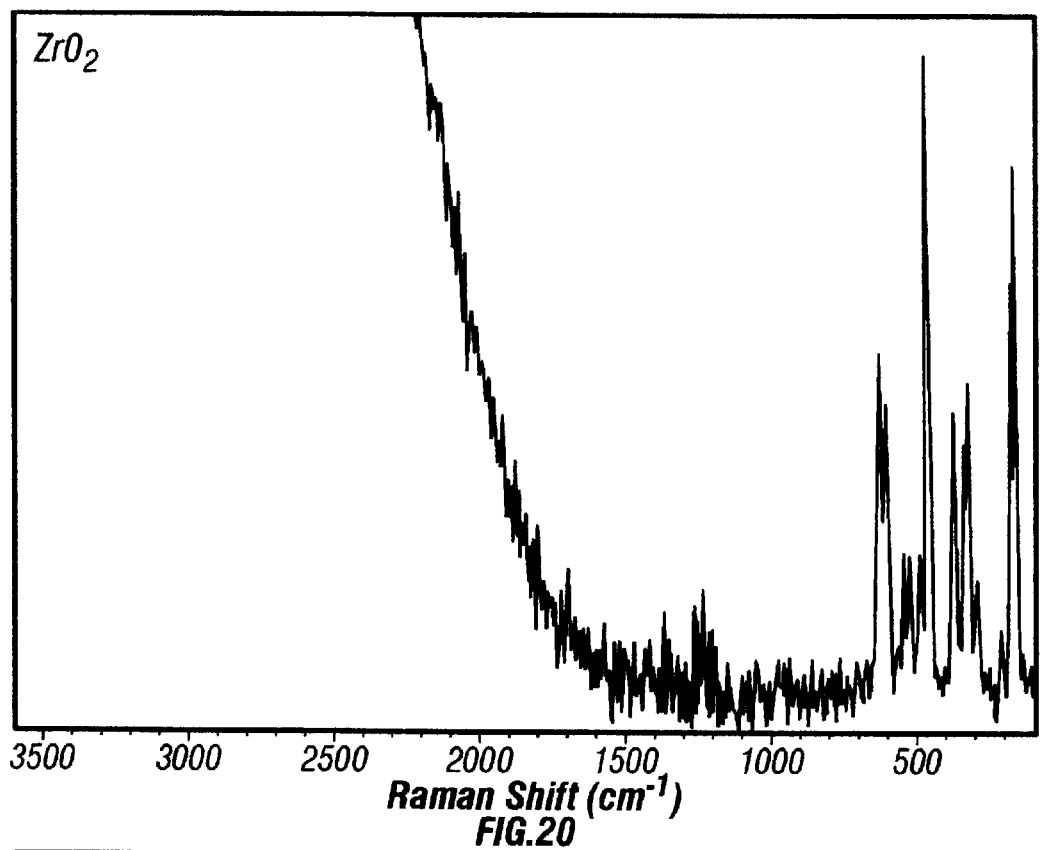
FIG. 20 is a graph of the Raman spectrum of monoclinic $ZrO_2$.
Figure 21:
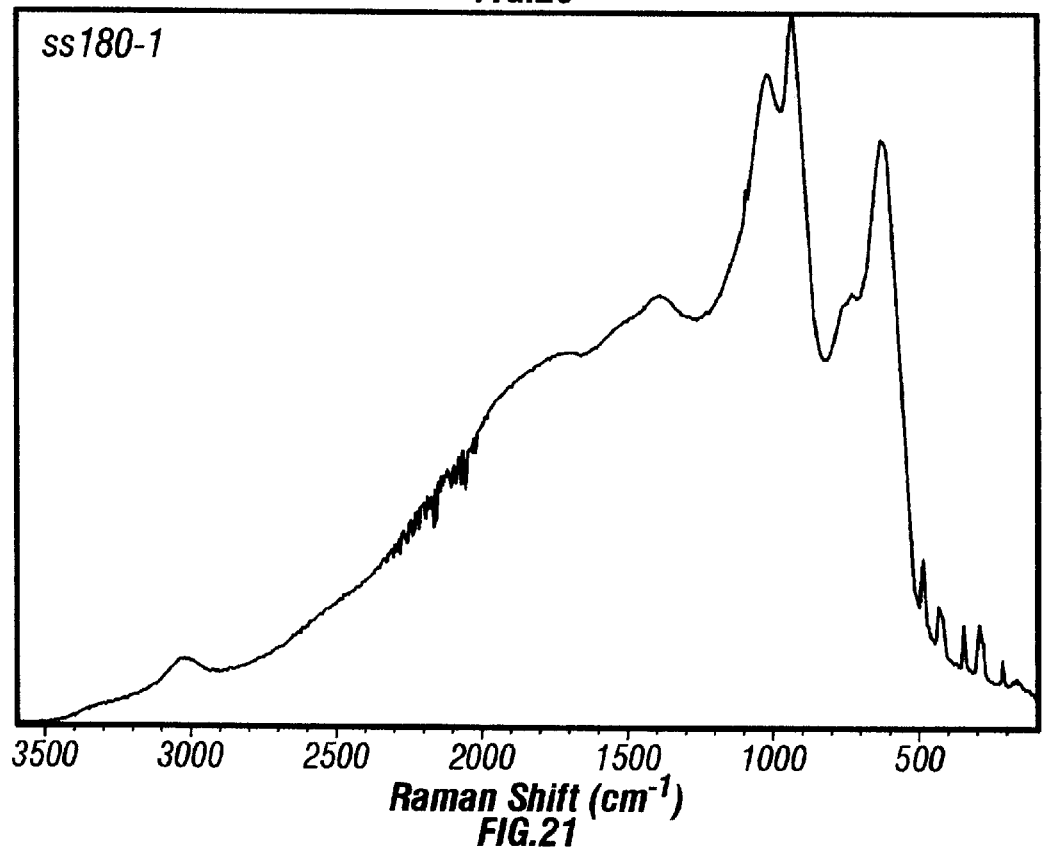
FIG. 21 is a graph of the Raman spectrum of a pure sample of $Na_2ZrO_3$.
Figure 22:
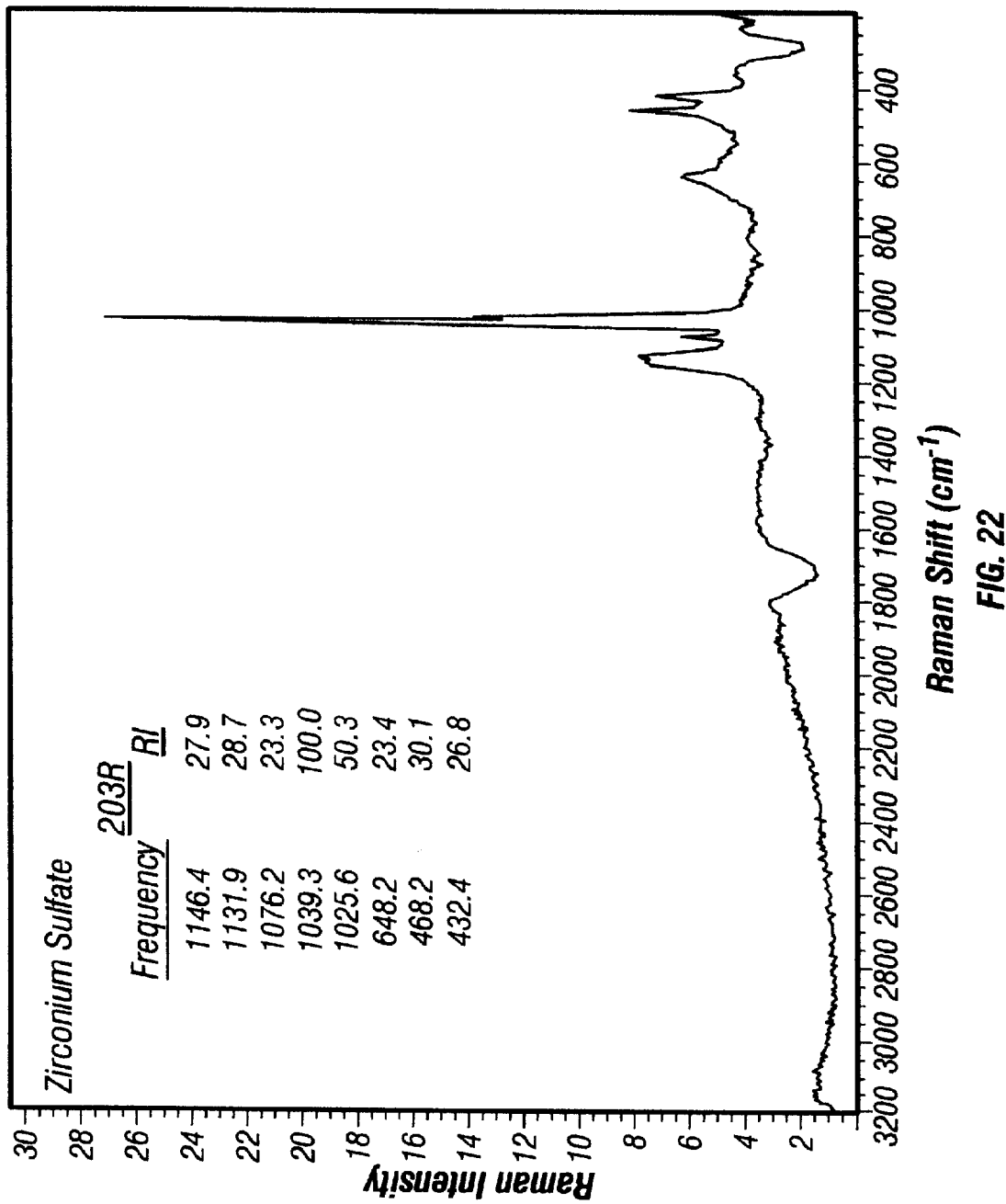
FIG. 22 is a graph of the Raman spectrum of a pure sample of $Zr(SO_4)_2$.

The experiment of FIG. 18 was repeated, but for a rich fuel mixture of $C_3H_8/O_2/N_2$=1.2/5/20 and with $SO_2$=40 ppm. The probe was maintained at a lower temperature of 600 K to encourage zirconium sulfate formation. The results shown in FIG. 19 show that only $ZrO_2$ and $Na_2SO_4$ were present, again confirming the inappropriateness of the choice of zirconium. FIG. 20 is a graph of the Raman spectrum of monoclinic $ZrO_2$, FIG. 21 is a graph of the Raman spectrum of a pure sample of $Na_2ZrO_3$, and FIG. 22 is a graph of the Raman spectrum of a pure sample of $Zr(SO_4)_2$, provided for comparison purposes to FIG. 19.

Figure 23:
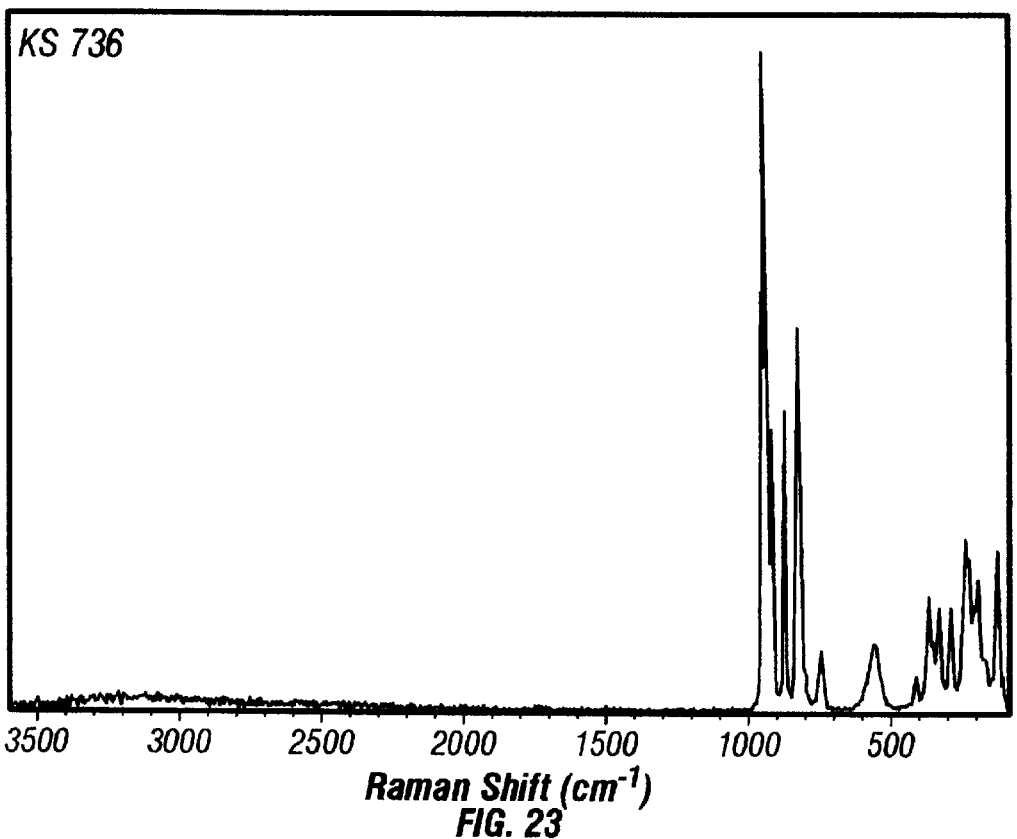
FIG. 23 is a graph of the Raman spectrum of a deposit from a lean fuel burned with Na:Mo:W=2:1:1 with Na=25 ppm.
Figure 24:
FIG. 24 is a graph of the Raman spectrum of a pure sample of $Na_2MoO_4$.

FIG. 23 is a graph of the Raman spectrum of a deposit from a lean fuel burned with Na:Mo:W=2:1:1 with Na=25 ppm as taken from a platinum probe at 850 K to test the effect of molybdenum. The results are very similar to that shown in FIG. 9 in that only the formation of sodium tungstate is shown. There is no evidence of the formation of $Na_2MoO_4$, which would produce the spectrum of FIG. 24. Sodium tungstates are the dominant sodium product shown in FIG. 23. Thus, it is concluded that molybdenum has no effect.

The results of there experiments and calculations, indicate that tungsten is the only element which was clearly effective. Niobium and tantalum may also be feasible additives. However, they are not as commercially available as tungsten which remains the preferred choice.

Figure 25:
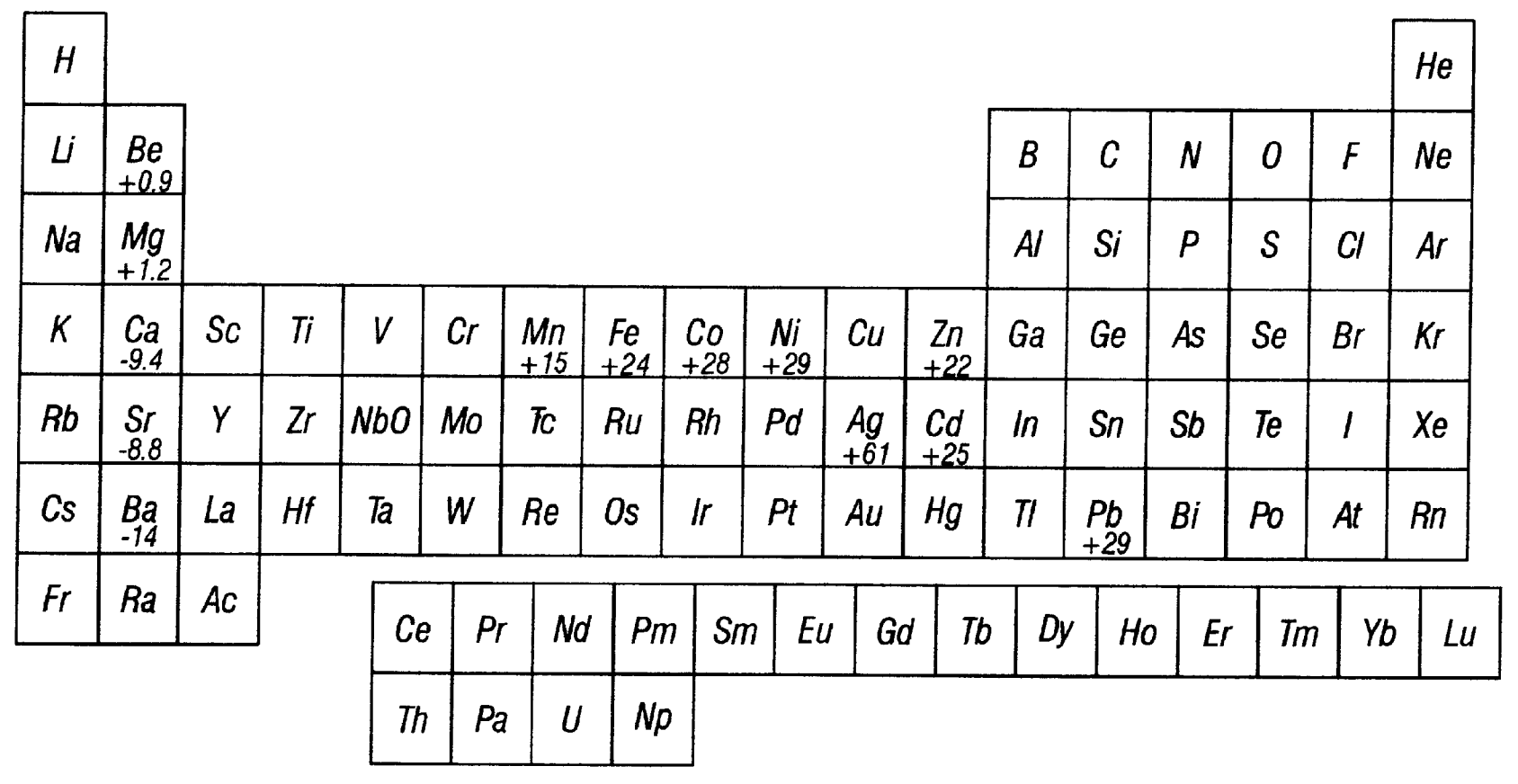

An additional question which has been extensively assessed is whether potential interferences exist for tungsten. FIG. 25 is a copy of the periodic table which illustrates the $\log_{10}$ (equilibrium constant) values at 700 K for the reaction,

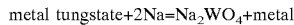

metal tungstate+2Na=$Na_2WO_4$+metal for various metals. A very rough indication of potential interferences with these components is thus indicated by the constants, but this really depends on the stability of other molecules of the metal that may be formed in the system. A positive number in FIG. 25 probably means that $Na_2WO_4$ will be dominant. Ca, Sr, and Ba appear to be potential interferants in the reaction, but experimental results indicate that this is not in fact the case. Many of the transition elements, such as Zr, Nb, Mo, Hf, and Ta, can be absorbed by $Na_2WO_4$ and form sodium metal tungstate bronzes. Thus, they are unlikely in fact to interfere.

Whether there might be some other element in combustion gases that has a greater affinity for tungsten than that of the alkali and so will modify its effectiveness has not been completely determined as of yet. So far, the only such candidates appeared to be calcium, strontium and barium which have stable tungstates. However, calculations and experiments adding Na, Ca, W, S or Cl simultaneously to flames still show a preference for sodium tungstate formation with the calcium producing benign calcium sulfate.

It is quite remarkable, that although sodium and sulfur may be present in flames at concentrations of only several parts per million, that they end up together chemically bound on a cooled surface in the flame. High temperature corrosion by $Na_2SO_4$ can be the result of such very small traces of sodium and sulfur in the burnt gases. The present work now has shown that this process can be disrupted by the addition of tungsten salts to the flame in quantities that are preferably 1.5 to 2 times or more the concentration of sodium in the flame. This not only prevents $Na_2SO_4$ formation, but should alleviate the additional problems that result from chlorine. Potassium appears to behave similarly but requires slightly larger quantities of tungsten, possibly twice that for sodium and is favored also by higher temperatures. The process appears to be a viable solution with regards to high temperature corrosion problems that relate to alkalis.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method of inhibiting corrosion in a flame reaction including an alkali metal comprising:

introducing an additive compound which includes W, Ta, Nb or mixtures thereof in said flame reaction, which additive forms a noncorrosive product with said alkali metal which is more chemically stable than sulfates of said alkali metal; and depositing said noncorrosive product onto cooler metal structures in or proximate to said flame reaction.

2. The method of claim 1 wherein said alkali metal is Na.
3. The method of claim 1 wherein said alkali metal is K.
4. The method of claim 1 wherein said additive includes W.
5. The method of claim 1 wherein said additive includes Nb.
6. The method of claim 1 wherein said additive includes Ta.
7. The method of claim 1 wherein said noncorrosive product comprises a tungstate of said alkali metal.

8. The method of claim 1 wherein said noncorrosive product comprises a tungstate of Na.

9. The method of claim 1 wherein said noncorrosive product comprises $XNbO_3$ where X is said alkali metal.

10. The method of claim 1 wherein said noncorrosive product comprises $XTaO_3$ where X is said alkali metal.

11. The method of claim 1 wherein said additive is added to said flame reaction in a furnace, boiler, turbine or any combustion apparatus utilizing such fossil fuel.

12. The method of claim 1 wherein said additive comprises ammonium metatungstate, ammonium paratungstate, ammonium tungstate, tungsten hexacarbonyl, tungsten oxides, tungstic acid and any organo-tungsten compound.

13. The method of claim 1 wherein said additive includes W and wherein the amount of atomic W in said additive is at least 1.5 to 2 times as much as the amount of atomic metal alkali in said flame reaction.

14. The method of claim 1 wherein said flame reaction is produced by combustion of a fuel and wherein said additive is mixed in with said fuel prior to combustion.

15. The method of claim 1 wherein said flame reaction is produced by combustion of a fuel and wherein said additive is injected into said combustion.

16. The method of claim 1 wherein said flame reaction includes sulfur.

17. The method of claim 1 wherein said flame reaction includes chlorine.

18. A method of inhibiting corrosion in a flame reaction including an alkali metal comprising:

introducing an additive in said flame reaction, which additive forms a noncorrosive product with said alkali metal which is more chemically stable than sulfates of said alkali metal; and depositing said noncorrosive product onto cooler metal structures in or proximate to said flame reaction, wherein said additive includes W, wherein said flame reaction includes Na, and wherein the amount of atomic W in said additive is at least 1.5 to 2 times as much as the amount of Na in said flame reaction.

19. A method of inhibiting corrosion in a flame reaction including an alkali metal comprising:

introducing an additive in said flame reaction, which additive forms a noncorrosive product with said alkali metal which is more chemically stable than sulfates of said alkali metal; and depositing said noncorrosive product onto cooler metal structures in or proximate to said flame reaction, wherein said additive includes W, wherein said flame reaction includes K, and wherein the amount of atomic W in said additive is at least 1.5 to 4 times as much as the amount of K in said flame reaction.

20. A method of inhibiting corrosion in a flame reaction including an alkali metal comprising:

introducing an additive in said flame reaction, which additive forms a noncorrosive product with said alkali metal which is more chemically stable than sulfates of said alkali metal; and depositing said noncorrosive product onto cooler metal structures in or proximate to said flame reaction, wherein said additive includes at least one element selected from the group consisting of W, Nb and Ta, and wherein the atomic amount of said element in said additive is at least 1.5 to 2 times as much as the atomic amount of metal alkali in said flame reaction.

* * * * *